United States Patent
Larsen et al.

(10) Patent No.: US 9,466,959 B2
(45) Date of Patent: Oct. 11, 2016

(54) PATHWAY CABLE GUIDE

(71) Applicants: Lars R. Larsen, Old Lyme, CT (US); Chris M. Vacca, Westerly, RI (US)

(72) Inventors: Lars R. Larsen, Old Lyme, CT (US); Chris M. Vacca, Westerly, RI (US)

(73) Assignee: Ortronics, Inc., New London, CT (US)

(*) Notice: Subject to any disclaimer, the term of this patent is extended or adjusted under 35 U.S.C. 154(b) by 156 days.

(21) Appl. No.: 14/163,552

(22) Filed: Jan. 24, 2014

(65) Prior Publication Data
US 2015/0214703 A1    Jul. 30, 2015

(51) Int. Cl.
*H02G 3/04* (2006.01)
*G02B 6/44* (2006.01)
*H02G 3/06* (2006.01)

(52) U.S. Cl.
CPC ............ *H02G 3/045* (2013.01); *G02B 6/4459* (2013.01); *G02B 6/4466* (2013.01); *G02B 6/4478* (2013.01); *H02G 3/0406* (2013.01); *H02G 3/0418* (2013.01); *H02G 3/0437* (2013.01); *H02G 3/0456* (2013.01); *H02G 3/0608* (2013.01); *Y10T 29/49117* (2015.01)

(58) Field of Classification Search
CPC ........ H02G 3/00; H02G 3/04; H02G 3/0406; H02G 3/0431; H02G 3/0437; H02G 3/045; H02G 3/22; H02G 3/30; H02G 3/28; H02G 3/0608; H02G 3/185; H02G 3/083; H02G 3/0456; H02G 1/00; H02G 3/0418; G02B 6/4459; G02B 6/4466; G02B 6/4478; Y10T 29/49117

USPC ............ 174/495, 68.1, 68.3, 135, 72 A, 480, 174/72 R, 650, 88 R, 70 C, 95, 153 G; 248/56, 49, 68.1; 385/134, 135; 52/220.1, 220.7

See application file for complete search history.

(56) References Cited

U.S. PATENT DOCUMENTS 5,101,079 A * 3/1992 Rodrigues ............. H02G 3/083
248/56
5,937,131 A    8/1999 Haataja et al.
(Continued)

FOREIGN PATENT DOCUMENTS

DE          3742448 A1    6/1989
WO     WO 0231549 A2     4/2002
WO    WO 2009142885 A1  11/2009

OTHER PUBLICATIONS

Extended European Search Report for European Patent No. 15152288.5 dated Sep. 15, 2015.

*Primary Examiner* — Angel R Estrada
(74) *Attorney, Agent, or Firm* — McCarter & English, LLP

(57) ABSTRACT

An exemplary cable guide can be provided that can include a base having a base radius sized to prevent breakage of a cable running over the base. At least two arms can extend from the base in a direction approximately perpendicular to a direction of travel of the cable raceway, the at least two arms having an arm radius sized to prevent breakage of the cable running around the at least two arms. At least two legs can be attached to the base extending in a direction approximately opposite of the at least two arms, the at least two legs having a leg radius sized to prevent breakage of the cable running around the at least two legs.

21 Claims, 9 Drawing Sheets

(56) References Cited

U.S. PATENT DOCUMENTS

| | | | | |
|---|---|---|---|---|
| 5,994,644 A * | 11/1999 | Rindoks | | H02G 3/0431 174/495 |
| 6,192,181 B1 | 2/2001 | Haataja et al. | | |
| 6,265,670 B1 * | 7/2001 | Duesterhoeft | | H02G 3/083 174/650 |
| 6,293,506 B1 * | 9/2001 | Gutgsell | | A47B 21/06 248/49 |
| 6,437,244 B1 * | 8/2002 | Vander Velde | | H02G 3/0418 174/101 |
| 6,448,495 B1 * | 9/2002 | Mattei | | G02B 6/4459 174/68.1 |
| 6,459,038 B1 * | 10/2002 | Waszak | | H02G 3/0608 174/68.3 |
| 6,522,823 B1 * | 2/2003 | Wentworth | | H02G 3/0608 385/134 |
| 6,535,683 B1 * | 3/2003 | Johnson | | H02G 3/0608 385/135 |
| 6,586,680 B1 * | 7/2003 | Nelson | | H02G 3/045 174/135 |
| 6,597,854 B2 | 7/2003 | Haataja et al. | | |
| 6,632,999 B2 * | 10/2003 | Sempliner | | H02G 3/185 174/153 G |
| 6,708,918 B2 * | 3/2004 | Ferris | | H02G 3/0406 248/68.1 |
| 6,810,191 B2 * | 10/2004 | Ferris | | H02G 3/0418 174/68.3 |
| 6,868,220 B2 | 3/2005 | Haataja et al. | | |
| 6,925,242 B2 | 8/2005 | Haataja et al. | | |
| 7,060,901 B2 * | 6/2006 | Herzog | | H02G 3/0418 174/135 |
| 7,167,625 B2 | 1/2007 | Haataja et al. | | |
| 7,825,337 B2 * | 11/2010 | Young, IV | | H02G 3/30 174/72 A |
| 7,825,342 B2 * | 11/2010 | Caveney | | H02G 3/0608 174/68.1 |
| 8,315,069 B2 | 11/2012 | Caveney | | |
| 8,502,071 B2 * | 8/2013 | Caveney | | H02G 3/22 174/68.3 |

* cited by examiner

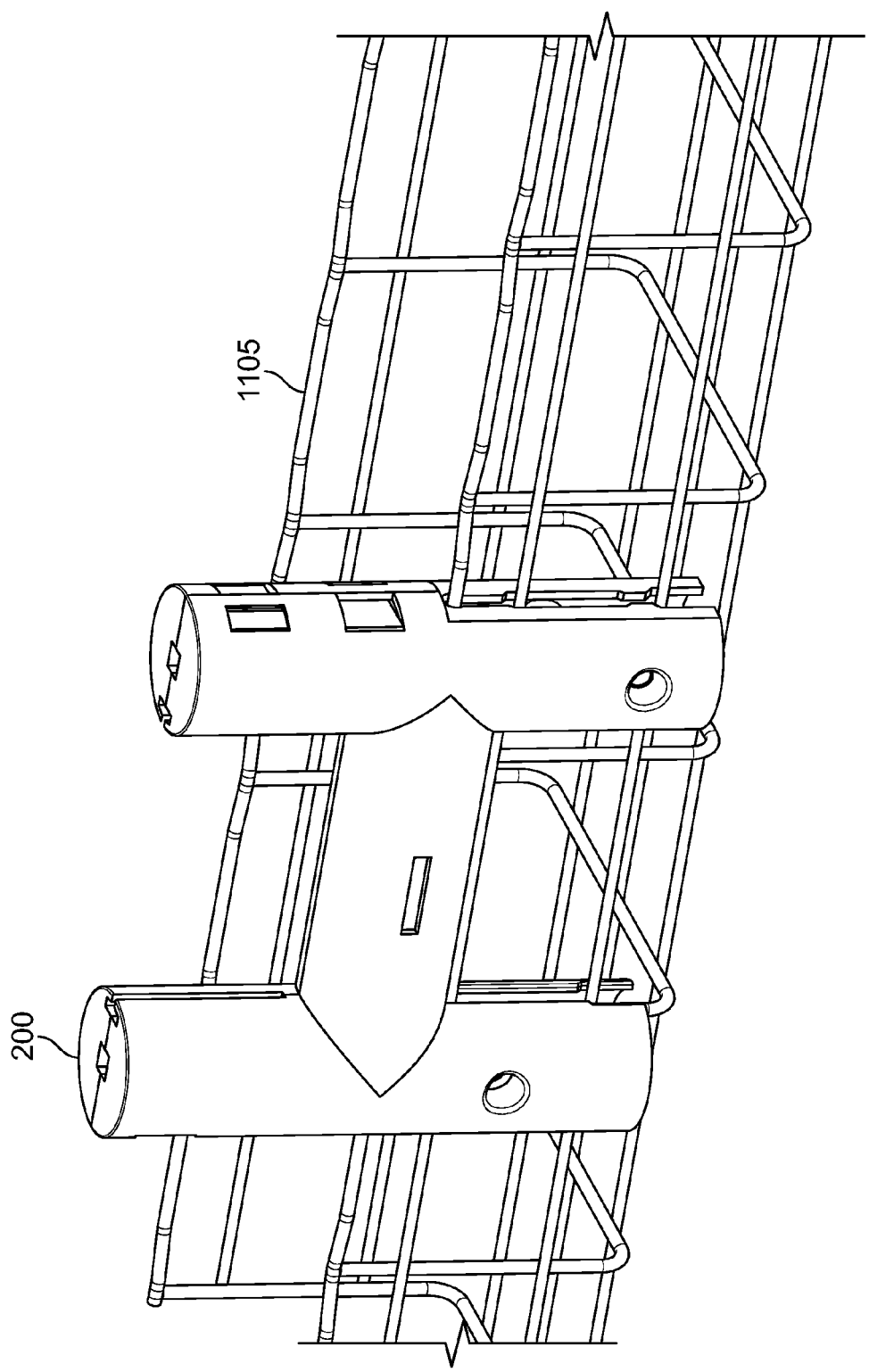

PATHWAY CABLE GUIDE

FIELD OF THE DISCLOSURE

Exemplary embodiments of the present disclosure relate generally to an exemplary apparatus for directing cables to enter and exit a cable raceway, and more specifically, to an exemplary cable guide for directing cables to enter and exit a cable raceway without interfering with other cables remaining inside the cable raceway.

BACKGROUND INFORMATION

A cable raceway is a system used for the protection and routing of cables, including power cables, data cables, and any other electrical cables. A cable raceway can be mounted to a wall, a ceiling, and/or on or under a floor, to direct cables to various points within a building (e.g., different rooms) or to various points within a room (e.g., to different servers etc. located within the same room). A cable raceway may be made of metal, plastic, fiber, or fired clay.

In order for cables (e.g., data cables, power cables etc.) to travel through a raceway, the cables must enter and exit at various point throughout the raceway to connect various devices together. For example, a data cable may begin at a networking switch, enter the raceway, travel through the raceway to another location in the room, exit the location at that point, and connect to a server. As a raceway will often contain multiple cables, a raceway may have multiple entrances and exits to access multiple devices located near the path of the raceway.

While the location of the various components within a room or a building may be known, the specific locations in the raceway where an entrance or exit may need to be located may not be known until the raceway has been installed. Thus, the various entrances and exits in the raceway may not be created or even known, until after the raceway has been installed, and the exact location of the entrances and exits can be determined. Therefore, it is common for ad-hoc entrances and exits to be created in the raceway after the raceway has been installed.

Currently, there are various types of ad-hoc entrances and exits depending on the type of raceway used. For example, if the raceway is a runway or ladder raceway (e.g., Raceway 1205 of FIG. 12), the cable can either be run through an opening in the floor of the raceway, or simply placed over the side of the raceway. However, such ad-hoc openings are disadvantageous because: 1) if the cable is run through the opening in the floor of the raceway, the angle (e.g., bend) in the cable can be so substantial as to snap or break the cable, or render the cable useless for its intended purpose (e.g., if the cable is an optical cable, a sharp bend can prevent a glass fiber in the cable from completely reflecting a light signal, resulting in degradation or loss of the signal or can cause a glass fiber within the cable to develop fractures), and 2) if the cable is simply placed over the side of the raceway, there is nothing preventing the entire cable from being pulled over the side of the raceway, negating the purpose of having a raceway.

If the raceway is a wire or tray raceway (e.g., Raceway 1105 of FIG. 11), the cable can be run through an opening in the floor of the raceway or an opening in the side of the raceway. While this can solve the problem of ensuring that the cable stays in the raceway until the exit, nothing prevents a cable from making a sharp bend having a small bend radius at an exit point, and such bends can break or reduce the performance of the cable. For a tray raceway (e.g., channel raceway 350 of FIG. 3), one can make a cable exit by simply routing it over a side wall of the raceway, or by cutting an opening into the side of the raceway for the cables to enter and exit. However, as is the case with a ladder raceway and a wire raceway, a channel raceway, by itself, cannot prevent a cable from developing a sharp bend at the exit point.

Attachment devices have been proposed that attempt to cure the problems above. For example, FIG. 1 shows a raceway attachment 100 designed to attach to a raceway 150. Raceway attachment 100 has a bend 105 in a direction parallel to the direction the cables are run through the raceway. Raceway attachment 100 also has a bend 110 in a direction perpendicular to the direction the cables are run through raceway 150. As the cables travel through the raceway, they bend around bend 105, and over bend 110 to exit the raceway. Sides 115 help maintain the cables in raceway attachment 100, and separation mechanism 120, through hook 125, separates the cables that exit raceway 150 from the cables passing by raceway attachment 100. While raceway attachment 100 can prevent some cables from bending to the point of breaking, raceway attachment 100 has many problems. First, in order to prevent the cables from breaking, the cable must be run under bend 105 and over bend 110. However, there is nothing that maintains the cable in such a position, and the cable can easily bypass bend 105, to run over bend 110, which can still result in an unacceptably sharp bend in the cable. Additionally, raceway attachment 100 only protects a cable exiting raceway 150 in a downward direction, and as such, cannot be used if the cable exits the raceway in upward or sideways directions. Further, raceway attachment 100 is constructed to attach only to a tray raceway, and lacks the versatility to attach to different types of raceways such as ladder raceways or wire raceways. Moreover, raceway attachment 100 must be fastened to the raceway using a fastener as it cannot support itself. Finally, raceway attachment 100 is expensive and difficult to manufacture due to the various bends and sides needed to protect the cables.

Thus, it may be beneficial to provide an exemplary cable guide that is easy and inexpensive to manufacture, that can easily be installed on any raceway type, that protects a cable entering or exiting in any direction, and that can overcome at least some of the deficiencies described herein above.

SUMMARY OF EXEMPLARY EMBODIMENTS

These and other objects of the present disclosure can be achieved by provision of a cable guide for use with a cable raceway including a base configured to attach to the cable raceway, the base portion having a base radius sized to prevent breakage of a cable running over the base, and at least two arms extending from the base in a direction approximately perpendicular to a direction of travel of the cable raceway, the at least two arms having an arm radius sized to prevent breakage of the cable running around the at least two arms. Each of the at least two arms is located on an opposing end of the base. The cable guide further may further include an adapter, an arm slot in each of the two arms configured to attach to the adapter, and an extension attached to the adapter. The extension may be configured to direct the cable in a downward direction, an upward direction, a sideways direction, or a lateral direction relative to a side of the cable raceway.

In some exemplary embodiments, the base radius and the arm radius are approximately the same. The base can include a slot configured to fit over a side of the cable raceway. At least two legs can extend from the base in a direction approximately opposite of the at least two arms. Each of the at least two legs can include a slot configured to fit over a side of the cable raceway. A brush can be configured to cover an opening in the cable raceway. The cable guide can include two pieces that are joined together to form the base and the at least two arms. A securing mechanism can be configured to secure the cable guide to the cable raceway. The base radius and the arm radius can be between about ½ an inch to about 2 inches.

In another exemplary embodiment of the present disclosure, an apparatus may be provided for directing cables, including a cable raceway and a cable guide attached to the cable raceway. The cable guide can include a base having a base radius sized to prevent breakage of a cable running over the base, at least two arms extending from the base in a direction approximately perpendicular to a direction of travel of the cable raceway, the at least two arms having an arm radius sized to prevent breakage of the cable running around the at least two arms, and at least two legs extending from the base in a direction approximately opposite of the at least two arms, the at least two legs having a leg radius sized to prevent breakage of the cable running around the at least two legs. A brush can be configured to cover an opening in the cable raceway where the cable guide is attached to the cable raceway.

In some exemplary embodiments, a slot can be located in each of the two legs configured to fit over a side of the cable raceway. A securing mechanism can be configured to secure the cable guide to the cable raceway. The apparatus can further include an adapter, an arm slot in each of the two arms configured to attach to the adapter, and an extension attached to the adapter configured to direct a cable in at least one of a downward direction, an upward direction, a sideways direction, or a lateral direction relative to a side of the cable raceway. The base radius, the arm radius, and the leg radius can be approximately the same. A cover can be configured to cover an opening in the cable raceway in a location where the cable guide is not located.

In another exemplary embodiment of the present disclosure, a method is provided for directing a cable through an exit in a cable raceway including providing a cable raceway, and attaching at least one cable guide to a side of the cable raceway. The cable guide can include a base having a base radius sized to prevent breakage of a cable running over the base, at least two arms extending from the base in a direction approximately perpendicular to a direction of travel of the cable raceway, the at least two arms having an arm radius sized to prevent breakage of the cable running around the at least two arms, and at least two legs extending from the base in a direction approximately opposite of the at least two arms, the at least two legs having a leg radius sized to prevent breakage of the cable running around the at least two legs. A cable can be run along the cable raceway and through the at least two arms of the cable guide to exit the cable raceway. The cable can be run in a downward direction, an upward direction, a sideways direction, or a lateral direction relative to a side of the cable raceway after the cable exits the cable raceway.

In another exemplary embodiment of the present disclosure, a cable guide is provided for use with a cable raceway, the cable guide including means for guiding a cable exiting the cable raceway that includes one or more radiused regions that prevent overbending of said cable, and means associated with the guide means for attaching the guide means with respect to the cable raceway including at least one slotted region configured and dimensioned to engage the cable raceway.

These and other objects, features and advantages of the exemplary embodiment of the present disclosure will become apparent upon reading the following detailed description of the exemplary embodiments of the present disclosure, when taken in conjunction with the appended claims.

BRIEF DESCRIPTIONS OF THE DRAWINGS

Further objects, features and advantages of the present disclosure will become apparent from the following detailed description taken in conjunction with the accompanying Figures showing illustrative embodiments of the present disclosure, in which:

FIG. 11 is a perspective view of the cable guide attached to a wire raceway according to an exemplary embodiment of the present disclosure.

Figure 1:
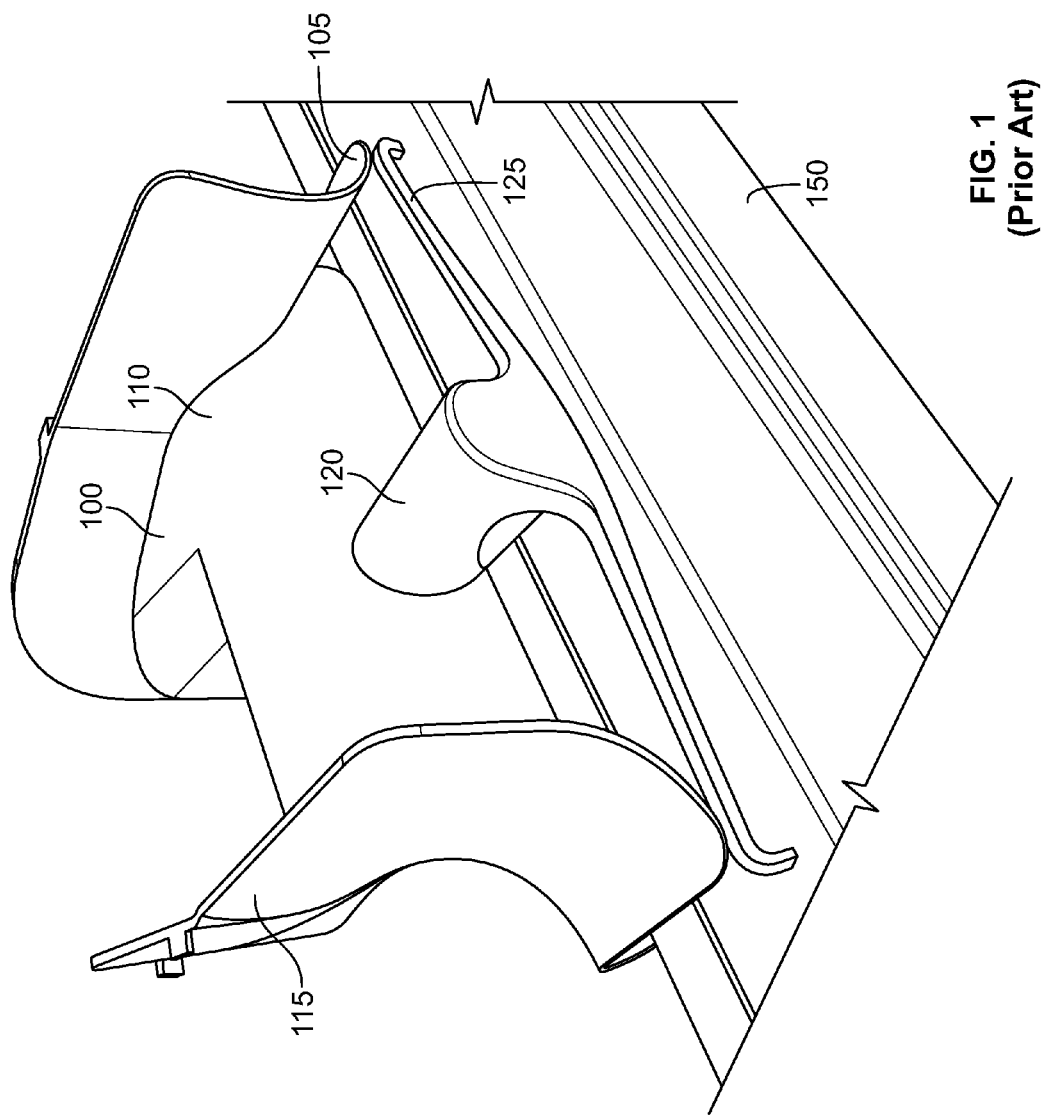
FIG. 1 is an image of a prior art raceway attachment attached to a channel raceway.

Throughout the drawings, the same reference numerals and characters, unless otherwise stated, are used to denote like features, elements, components, or portions of the illustrated embodiments. Moreover, while the present disclosure will now be described in detail with reference to the figures, it is done so in connection with the illustrative embodiments and is not limited by the particular embodiments illustrated in the figures. It is intended that changes and modifications can be made to the described exemplary embodiments without departing from the true scope and spirit of the subject disclosure as defined by the appended claims.

DETAILED DESCRIPTION OF EXEMPLARY EMBODIMENTS

The exemplary embodiments of the present disclosure may be further understood with reference to the following description and the related appended drawings, wherein like elements are provided with the same reference numerals. Exemplary embodiments of the present disclosure are related to an apparatus for protecting cables as they enter and exit a cable raceway. Specifically, the exemplary apparatus provides for a suitable bend in the cable, facilitating entry and exit of the cable from the cable raceway, while preventing a sufficient bend that can snap or distort the cable. Exemplary embodiments described herein relate to a data cable such as a fiber optic cable, however, those skilled in the art will understand that various other data cables and non-data cables, for example, cables employing copper wires, can be used in conjunction with the exemplary apparatus.

Figure 2:
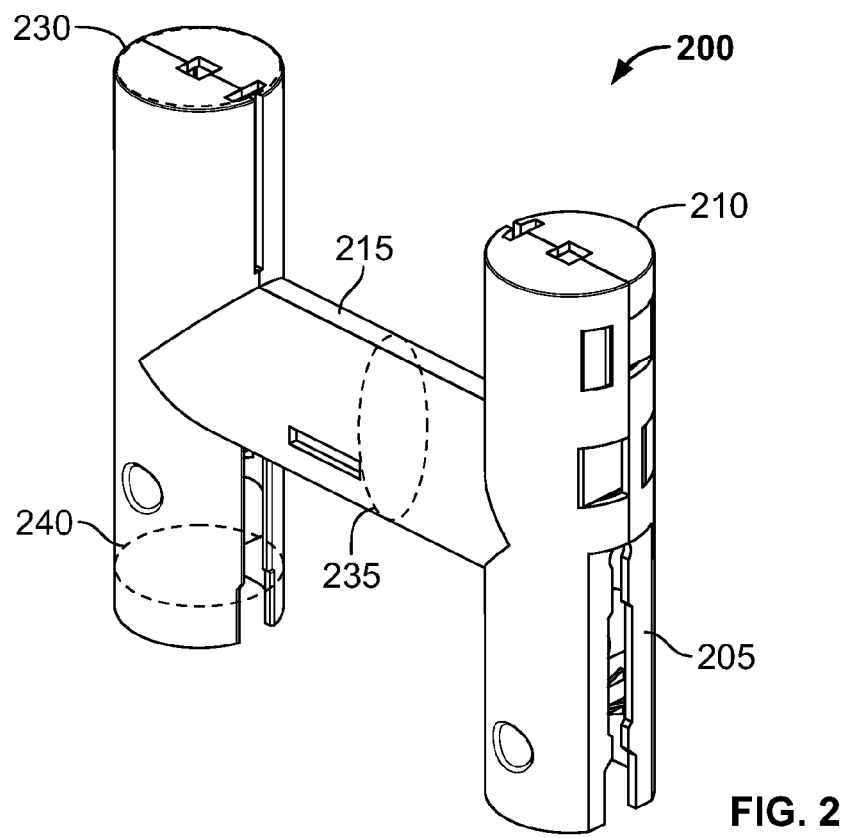
FIG. 2 is a perspective view of a cable guide according to an exemplary embodiment of the present disclosure.

Referring to FIG. 2, an exemplary apparatus or cable guide 200 is shown. Cable guide 200 can be made from plastic, metal, rubber or any other suitable material. Cable guide 200 can be made from as a single piece (e.g., as a single piece of molded plastic), or cable guide 200 can be made from multiple pieces and then snapped together to form the structure. In particular, FIG. 2 shows a cable guide 200 that is made from two pieces that are snapped together. The two pieces have the exact same structure, and the resulting cable guide is symmetrical. Such a modular design can be advantageous as only a single mold that is simple in shape is needed. This can greatly improve the manufacturability of cable guide 200, especially at low product volumes when it is preferable to keep mold costs down. Additionally, cable guide 200 can be solid or hollow. A hollow cable guide 200 facilitates cheaper manufacturing as less material is need.

Cable guide 200 can have a base portion 215, first extensions or legs 205, and second extensions or arms 210. Legs 205 can extend in a perpendicular direction to base portion 215 (e.g., in a downward direction), and can extend from opposing ends of base portion 215, or at various locations along base portion 215. Arms 210 can also extend in a perpendicular direction (e.g., an upward direction), and generally extend in a direction opposite from the direction of extension of legs 205 (e.g., at 180 degrees from the direction of extension of legs 205. It should be known that arms 210 can extend at various other degrees from legs 205 (e.g., not 180 degrees). Arms 210 can extend from opposing ends of base portion 215, or arms 210 can extend from various locations along base portion 215. As shown in FIG. 2, cable guide 200 can have two legs 205 that are spaced apart from each other (e.g., at ends of base portion 215) and are in a generally parallel relationship. Similarly, cable guide 200 can have two arms 210 that spaced apart from each other (e.g., at ends of base portion 215) and are also in a generally parallel relationship. In the exemplary embodiment illustrated in FIG. 2, there are 2 legs and 2 arms, with one leg and one arm extending from base portion 215 at the same location. However, in some exemplary embodiments, legs 205 and arms 210 can extend from different locations on base portion 215.

Base portion 215, legs 205, and arms 210 are shown as generally cylindrical in shape, but it should be understood that other shapes are possible. Base portion 215, legs 205, and arms 210 are also depicted as having generally the same circumference or, stated another way, having cross-sections with generally the same diameter. Additionally, as shown in FIG. 2, legs 205 and arms 210 may generally have the same overall length). Alternatively, base portion 215, legs 205, and arms 210 can have different circumferences and different lengths.

Figure 3:
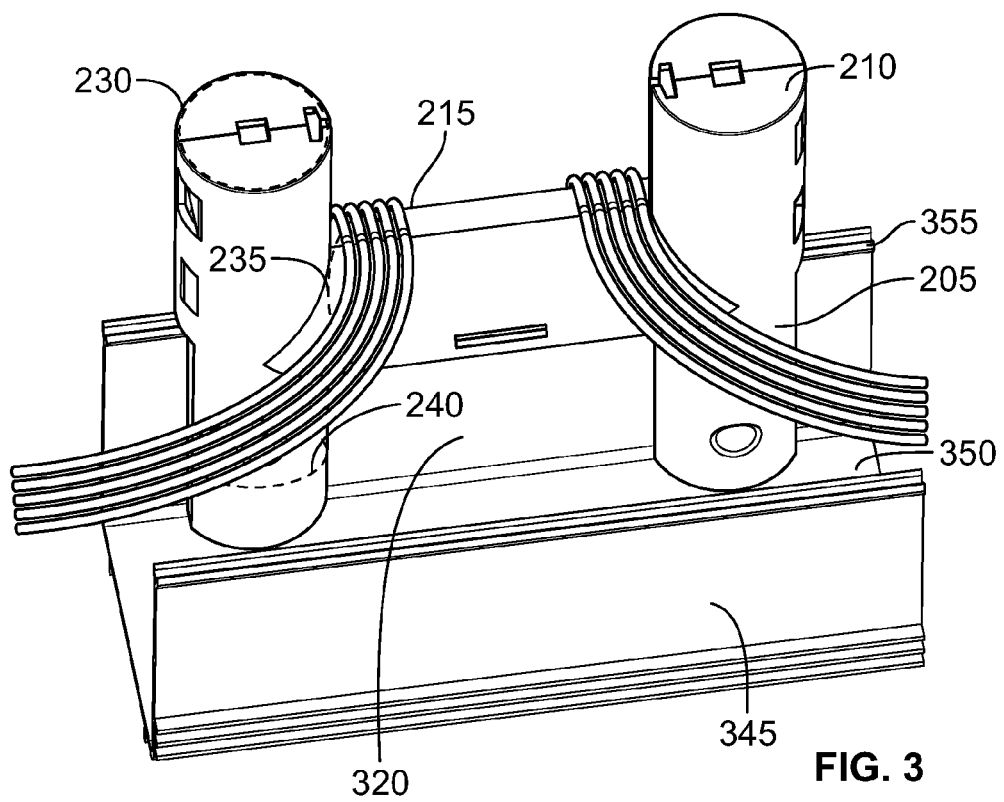
FIG. 3 is a perspective view of the cable guide attached to a channel raceway according to an exemplary embodiment of the present disclosure.
Figure 4:
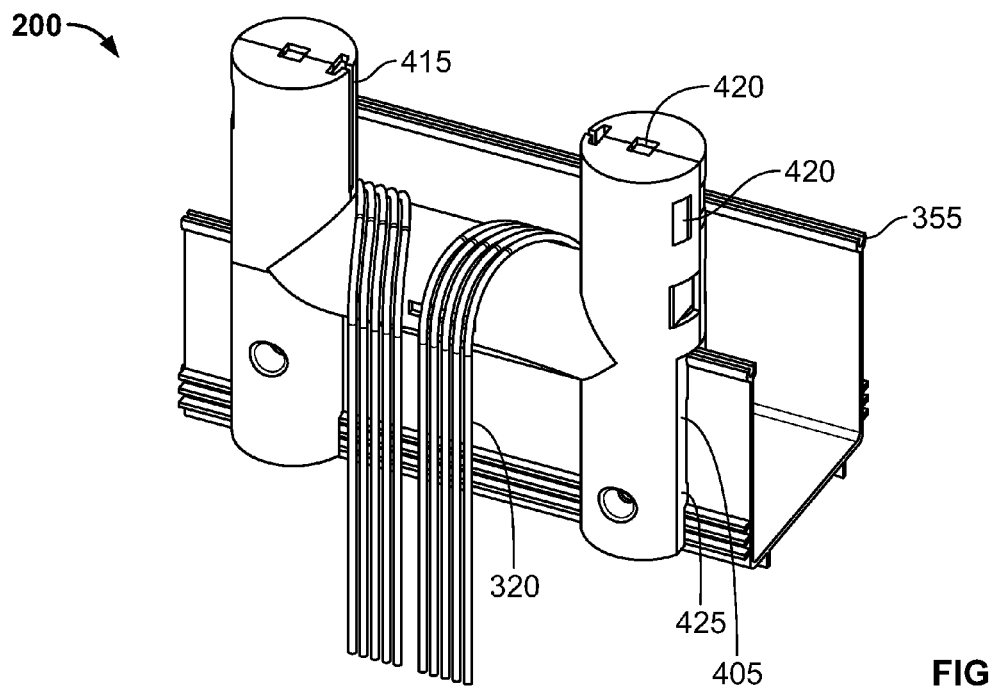
FIG. 4 is a side view of the cable guide attached to a channel raceway according to an exemplary embodiment of the present disclosure.

FIG. 3 illustrates exemplary cable guide 200 installed or attached to a cable raceway 350 (e.g., a channel raceway as shown). Channel raceway 350 has a solid bottom 345 and sides 355. Cables that run through channel raceway 350 are supported by bottom 345, and are bounded on each side by side 355. As shown, legs 205 and arms 210 are at a generally parallel direction to side 355, however, it should be known that arms 210 can be non-parallel in relation to side 355 (e.g., arms 210 can overhang channel raceway 350 or directed away from channel raceway 350). As shown, cables 320 are running through channel raceway 350, exit channel raceway 350 at any point through cable guide 200, and can be directed in a direction away from channel raceway 350 (e.g., in a downward direction as shown in FIG. 4). In order to prevent any distortion or breakage in any cable 320, circumferences 230, 235 and 240 are sized to prevent cables 320 from overbending. For example, circumferences 230 and 235 are sized to prevents overbending in any cable 320 that exits channel raceway 350 through cable guide 200. Further, circumference 240 of legs 205 are sized to prevent an overbend in any cable 320 that either exits channel raceway 350 through cable guide 200, or any cable that passes by cable guide 200. Thus every surface of cable guide 200 can be curved to prevent any distortion or breakage of any cable that passes through or by cable guide 200. As such, there is no possibility that any cable can fall below a minimum bend radius. Exemplary circumferences can include circumferences that have a radius of about ½ inch or more.

Referring to FIG. 4, cable guide 200 can be attached to channel raceway 350 through an opening or slot 405 that can extend through legs 205 or base portion 215. In order to install or attach cable guide 200 to channel raceway 350, cable guide 200 is placed above side 355, and is then moved such that side 355 enters into slot 405. As shown in FIG. 4, slots 405 are located in legs 205 through base portion 215, however, in an exemplary embodiment, legs 205 need not be separated, or need not be present, and slot 405 extends only through base portion 205 which is attached to side 355 of channel raceway 350. Alternatively, slots 405 can extend only through legs 205, and not through base portion 215. Slots 405 are advantageous as they facilitate a connection between cable guide 200 and any type of channel raceway, facilitating the use of a single cable guide design on multiple raceways. In order to facilitate connections to multiple types of raceways, slots 405 can include various contours and projections (e.g., projection 425) to aid in securing to the various types of raceways.

Figure 5:
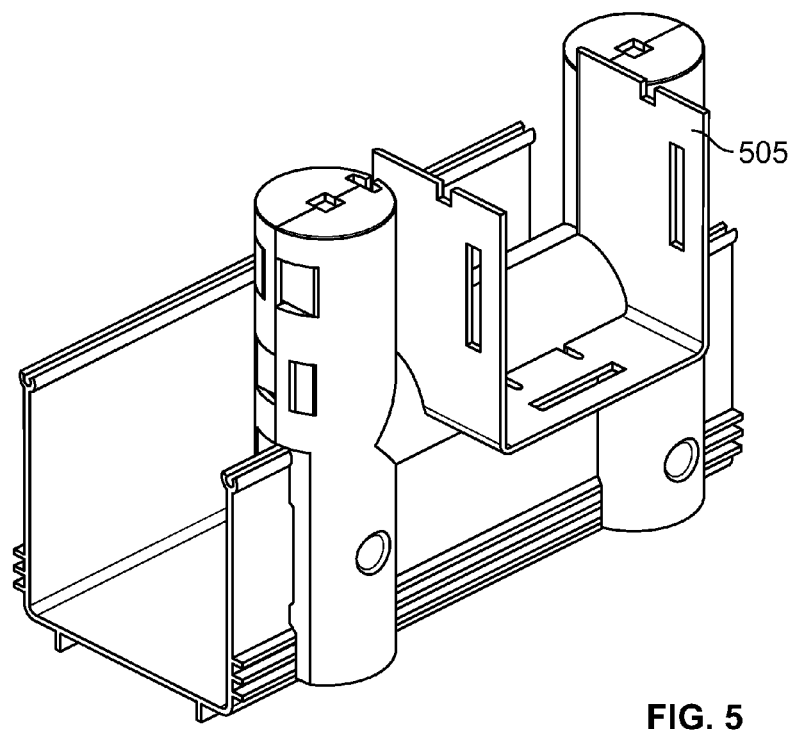
FIG. 5 is a side view of the cable guide, with an adapter according to an exemplary embodiment of the present disclosure.

Cable guide 200 can also include upper slits 415 that can be used to connect to an optional adapter 505 (see e.g., FIG. 5) that can connect to other channel raceways or channel raceway fittings (see e.g., FIG. 6) that direct cables 320 routed out of channel raceway 350 through cable guide 200 in a straight, upward, downward, or sideways direction. Additionally, cable guide 200 can include one or more connection points 420, which facilitate the connection of two halves to form the cylindrically-shaped cable guide 200.

Cable guide 200 can also have one or more securing mechanisms 425 located in either base portion 215 or legs 205. Securing mechanism 425 can be used to secure cable guide 200 to channel raceway 350 to prevent cable guide 200 from moving in a sideways direction. For example, once cable guide 200 has been installed or attached to channel raceway 350, and the particular location of cable guide 200 is set to facilitate entry or exit of a cable, cable guide 200 can be secured to channel raceway 350 using securing mechanism 425 to maintain the position of cable guide 200.

Exemplary securing mechanisms can include screws, nails, pins or any other suitable securing mechanism. It should be understood that cable guide 200 can be constructed with slots 405 that are sufficiently long such that cable guide 200 can support itself on a raceway without a securing mechanism.

Figure 6:
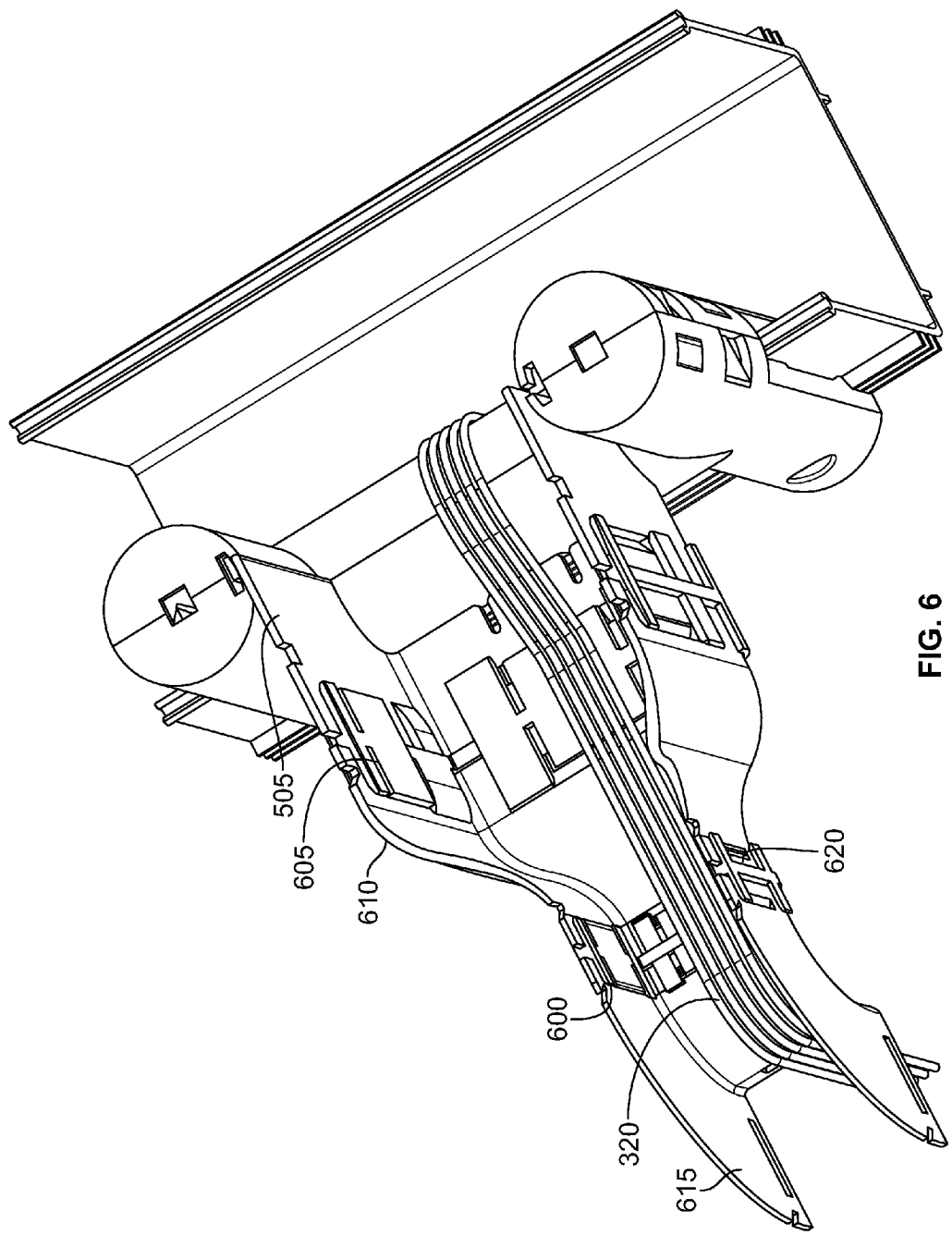
FIG. 6 is a side view of the cable guide, with an adapter directing a cable in a downward direction according to an exemplary embodiment of the present disclosure.
Figure 7:
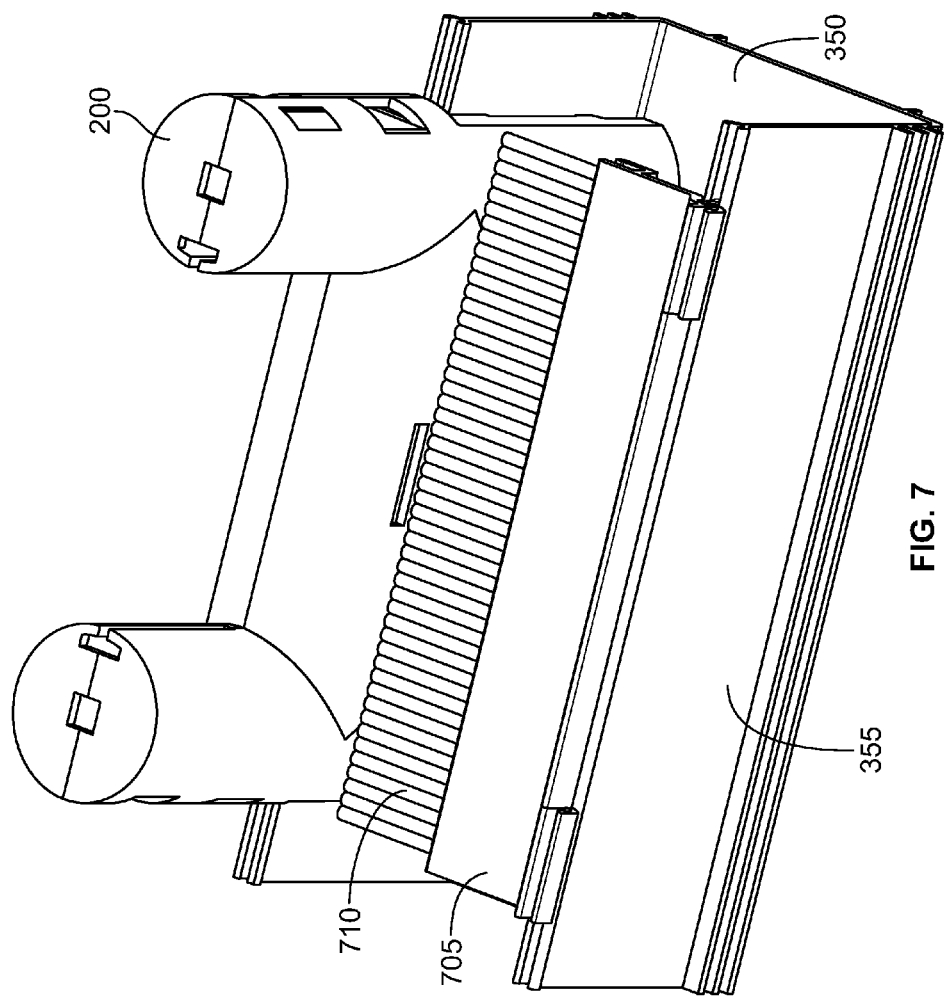
FIG. 7 is a perspective view of the cable guide having a brush cover in the closed position according to an exemplary embodiment of the present disclosure.
Figure 8:
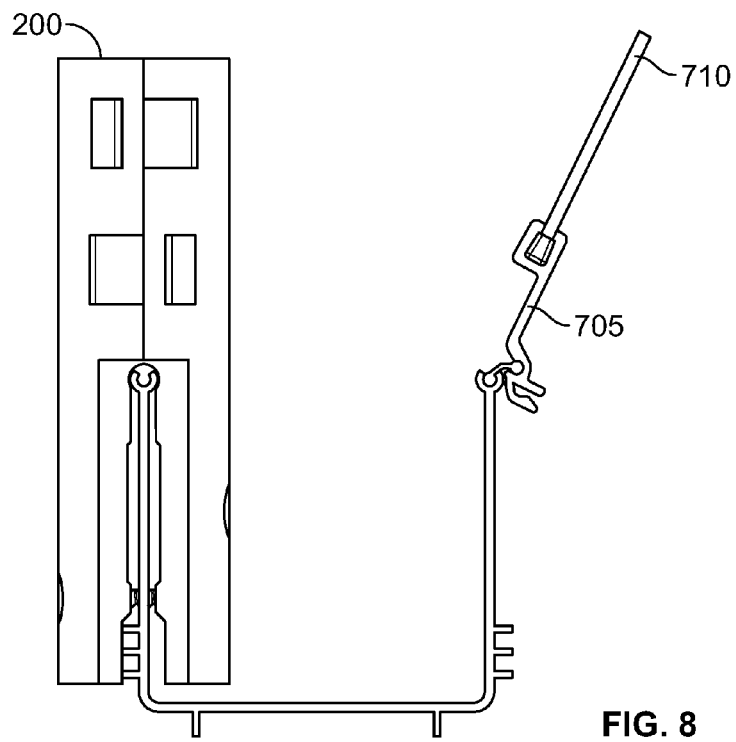
FIG. 8 is a perspective view of the cable guide having a brush cover in the open position according to an exemplary embodiment of the present disclosure.
Figure 9:
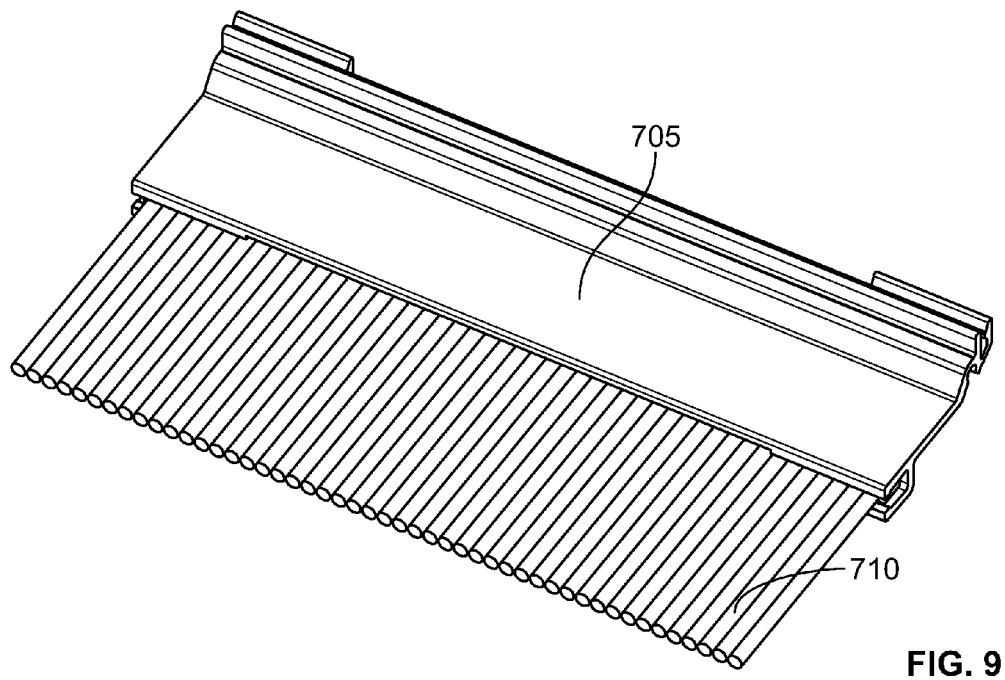
FIG. 9 is a perspective view of brush that can be used in conjunction with the cable guide according to an exemplary embodiment of the present disclosure.

FIG. 6 illustrates cable guide 200 having an optional adapter 505 connected to a channel raceway fitting 600. Channel raceway fitting 600 can connect to adapter 505 through connection 605. Channel raceway fitting 600 can have a first fitting 610 (e.g., a reducer such as a 4" by 2" reducer to a 2" by 2" flexible duct) extending laterally from adapter 505. First fitting 610 can connect to a second fitting 615 (e.g., a down elbow or down spout) through connection 620. Second fitting 615 can extend in multiple directions from adapter 505. For example, as shown in FIG. 6, second fitting 615 can extend in a downward direction relative to channel raceway 350. However, second fitting 615 can also extend in a lateral direction, upward direction (e.g., up elbow or up spout), or sideways direction relative to channel raceway 350.

Figure 10A:
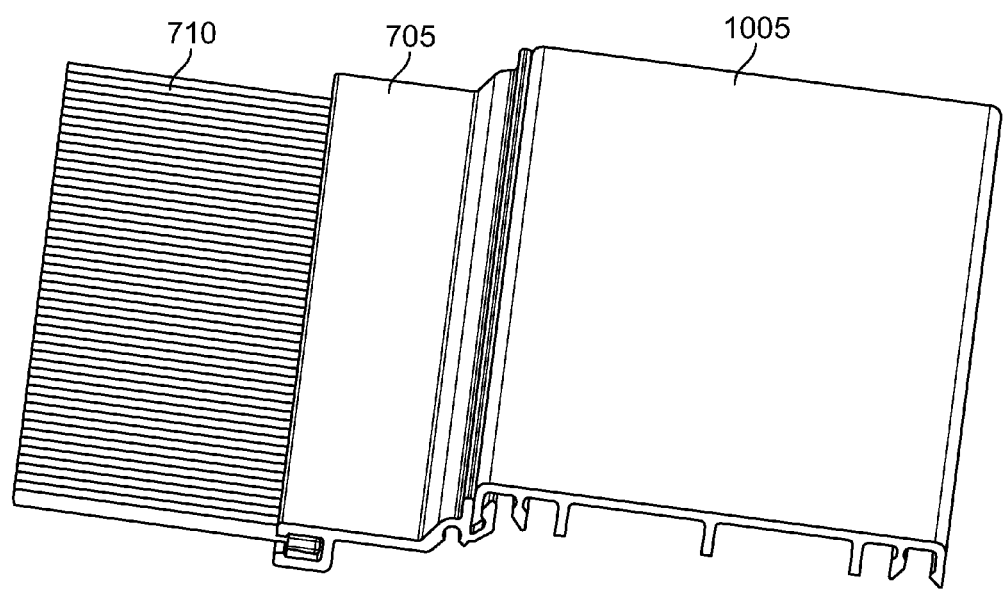
FIGS. 10A and 10B are side views of an extension cover and brush that can be used in conjunction with the cable guide according to an exemplary embodiment of the present disclosure.
Figure 10B:
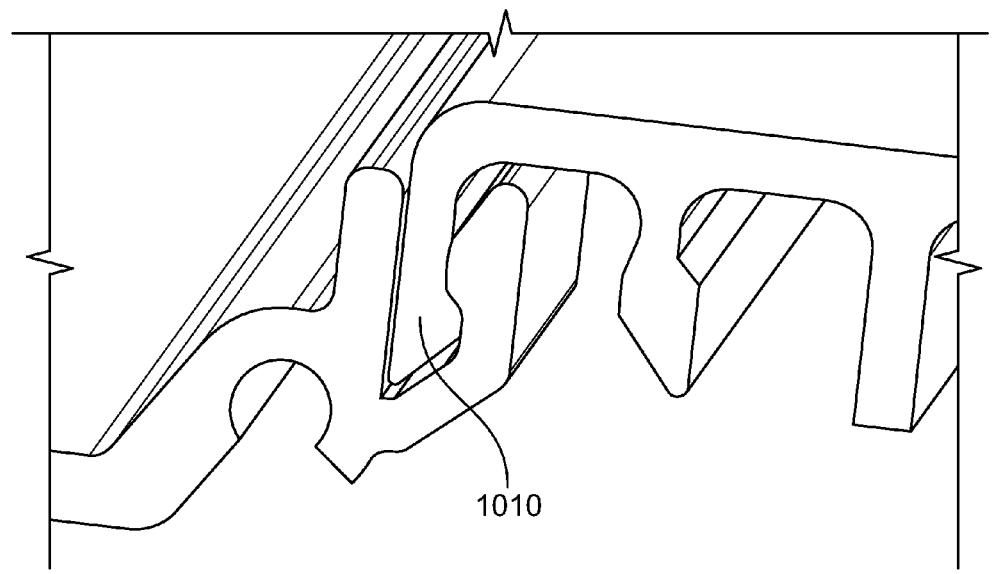

Referring to FIGS. 7-10B, a brush 710 can cover the opening in channel raceway 350 to facilitate the exit of cables 320 while preventing debris from entering into channel raceway 350. Brush 710 can attach to an extension 705, which can attach to side 355 of channel raceway 350. Brush 710 can be made of any suitable material and can be any suitable size covering all or a portion of the opening in channel raceway 350. Additionally, extension 705 can be suitably sized depending on the size of brush 710. As shown in FIGS. 10A and 10B, brush 710 and extension 805 can be connected to a second extension fitting 1005, which can extend brush 705 if the cable raceway opening is particularly large. Extension fitting 805 can connect to second extension fitting 1005 through connection 1010.

Figure 12:
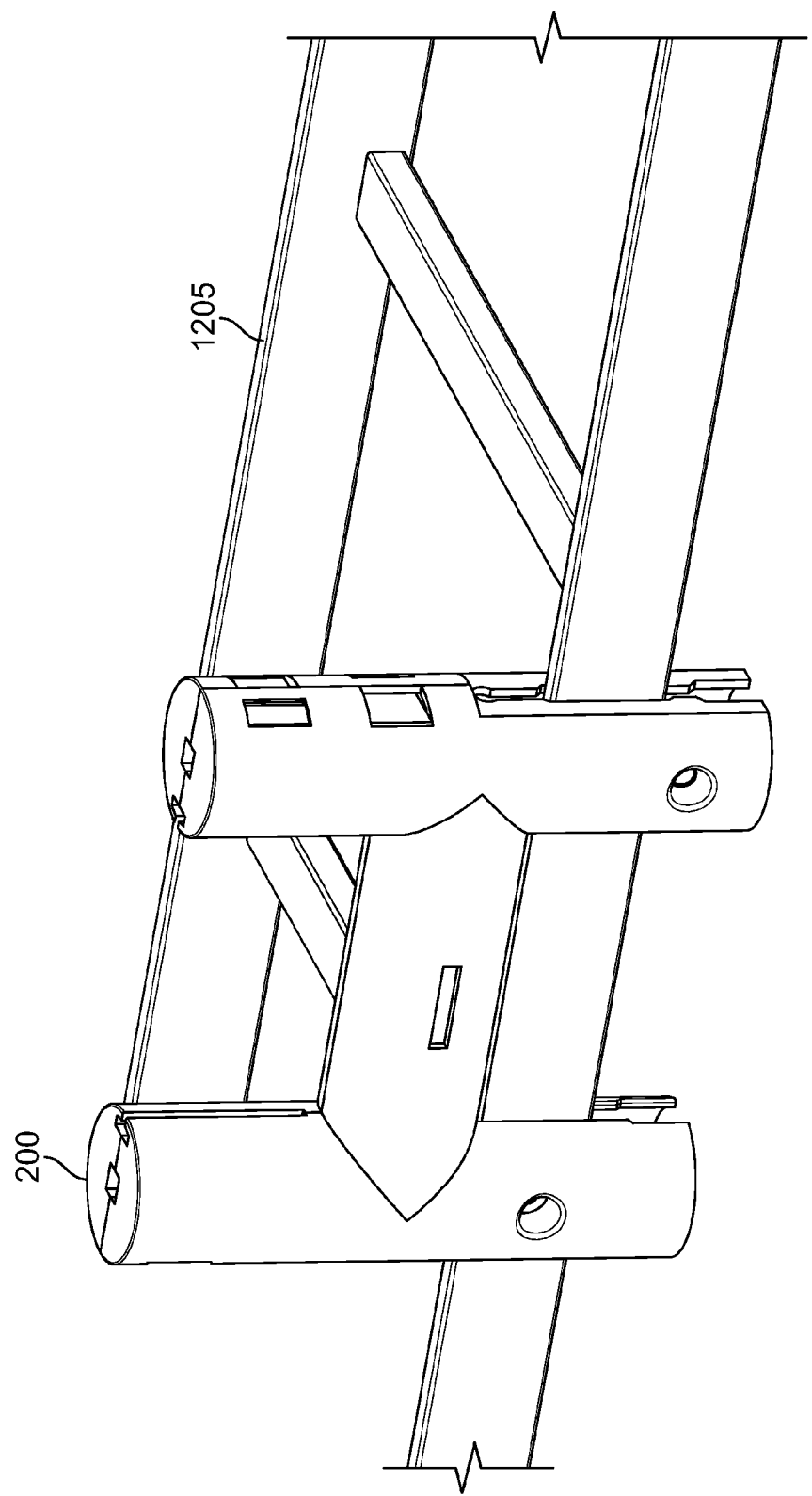
FIG. 12 is a perspective view of the cable guide attached to a ladder raceway according to an exemplary embodiment of the present disclosure.

FIGS. 11 and 12 illustrate further exemplary cable raceways. For example, FIG. 11 illustrates a wire or tray raceway 1105, and FIG. 12 illustrates a runway or ladder raceway 1205. Regardless of which raceway is used, cable guide 200 can fit over the side of the raceway. As such, cable guide 200 can be used in conjunction with any cable raceway.

For purposes of the present disclosure, exemplary cable guides may include means for guiding a cable exiting the cable raceway that includes one or more radiused regions that prevent overbending of the cable, for example, base portion 215 and arms 210 can have regions with sufficient radius to prevent overbending of the cable. The exemplary cable guide can also include means associated with the guide means for attaching the guide means with respect to the cable raceway including at least one slotted region configured and dimensioned to engage the cable raceway, for example, base portion 215 and/or legs 205 can include one or more slots 405 configured to fit over the side of channel raceway 350.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. Further, to the extent that the prior art knowledge has not been explicitly incorporated by reference herein above, it is explicitly incorporated herein in its entirety. All publications referenced are incorporated herein by reference in their entireties.

What is claimed is:

1. A cable guide comprising:
   a cylindrical base portion configured to attach to a cable raceway, the cylindrical base portion having a base radius sized to prevent breakage of a cable running over the cylindrical base portion;
   two cylindrical arms extending from the cylindrical base portion in a direction approximately perpendicular to a direction of travel of the cable raceway, the two cylindrical arms having an arm radius sized to prevent breakage of the cable running around the two cylindrical arms, the two cylindrical arms located on opposing ends of the cylindrical base portion; and
   two cylindrical legs extending from the cylindrical base portion in a direction approximately opposite of the two cylindrical arms, the two cylindrical legs located on opposing ends of the cylindrical base portion; and
   a slot extending through the cylindrical base portion and extending through the two cylindrical legs, the slot configured to fit over and around a first side of the cable raceway such that the first side enters into the slot to secure the cylindrical base portion to the first side of the cable raceway.

2. The cable guide of claim 1, wherein the cylindrical base portion includes a first base member and a second base member;
   wherein the first cylindrical arm includes a first arm portion and a second arm portion;
   wherein the second cylindrical arm includes a third arm portion and a fourth arm portion;
   wherein the first cylindrical leg includes a first leg portion and a second leg portion;
   wherein the second cylindrical leg includes a third leg portion and a fourth leg portion;
   wherein the first base member, the first arm portion, the third arm portion, the first leg portion and the third leg portion are integral to one another and form a first half member;
   wherein the second base member, the second arm portion, the fourth arm portion, the second leg portion and the fourth leg portion are integral to one another and form a second half member;
   wherein the first and second half members are mirror images of one another, and are configured to be mounted together to form the cylindrical base portion, the two cylindrical arms and the two cylindrical legs.

3. The cable guide of claim 1, further comprising:
   an adapter;
   an arm slit in each of the two cylindrical arms configured to attach to the adapter; and
   a channel raceway fitting attached to the adapter.

4. The cable guide of claim 3, wherein the a channel raceway fitting is configured to direct the cable in at least one of a downward direction, an upward direction, a sideways direction, or a lateral direction relative to the first side of the cable raceway.

5. The cable guide of claim 3, wherein the channel raceway fitting includes a first fitting extending laterally from adapter, and a second fitting connected to the first fitting, the second fitting extending in a downward direction relative to channel raceway.

6. The cable guide of claim 1, wherein the slot includes at least one projection, each projection configured and dimensioned to facilitate securement of the cylindrical base portion to the first side of the cable raceway.

7. The cable guide of claim 1, wherein the two cylindrical arms each extend a first distance from the base portion, and the two cylindrical legs each extend a second distance from the base portion, the first distance equal to the second distance.

8. The cable guide of claim 1, wherein the base portion has a first circumference, the two cylindrical arms each have a second circumference and the two cylindrical legs each have a third circumference, the first, second and third circumferences equal to one another.

9. The cable guide of claim 1, further comprising a brush configured to be secured, via an extension member, to a second side of the cable raceway, the brush configured to cover an opening in the cable raceway.

10. The cable guide of claim 1, wherein the cable is a fiber optic cable.

11. The cable guide of claim 6, wherein the at least one projection is configured to prevent the cylindrical base portion from moving in a sideways direction and is configured to maintain the position of the cylindrical base portion relative to the first side of the cable raceway.

12. The cable guide of claim 1, wherein the base radius and the arm radius are between about ½ an inch to about 2 inches.

13. An apparatus for directing cables, comprising:
a cable raceway;
a cable guide attached to the cable raceway, the cable guide including:
  a cylindrical base portion having a base radius sized to prevent breakage of a cable running over the cylindrical base portion;
  two cylindrical arms extending from the cylindrical base portion in a direction approximately perpendicular to a direction of travel of the cable raceway, the two cylindrical arms having an arm radius sized to prevent breakage of the cable running around the two cylindrical arms, the two cylindrical arms located on opposing ends of the cylindrical base portion;
  two cylindrical legs extending from the cylindrical base portion in a direction approximately opposite of the two cylindrical arms, the two cylindrical legs having a leg radius sized to prevent breakage of the cable running around the at least two cylindrical legs, the two cylindrical legs located on opposing ends of the cylindrical base portion; and
  a slot extending through the cylindrical base portion and extending through the two cylindrical legs, the slot configured to fit over and around a first side of the cable raceway such that the first side enters into the slot to secure the cylindrical base portion to the first side of the cable raceway; and
a brush configured to cover an opening in the cable raceway where the cable guide is attached to the cable raceway.

14. The apparatus of claim 13, wherein the slot includes at least one projection, each projection configured and dimensioned to facilitate securement of the cylindrical base portion to the first side of the cable raceway.

15. The apparatus of claim 14, wherein the at least one projection is configured to prevent the cylindrical base portion from moving in a sideways direction and is configured to maintain the position of the cylindrical base portion relative to the first side of the cable raceway.

16. The apparatus of claim 14, further comprising:
an adapter;
an arm slit in each of the two cylindrical arms configured to attach to the adapter; and
a channel raceway fitting attached to the adapter configured to direct a cable in at least one of a downward direction, an upward direction, a sideways direction, or a lateral direction relative to a side of the cable raceway.

17. The apparatus of claim 13, wherein the base radius, the arm radius, and the leg radius are approximately the same.

18. The apparatus of claim 13, further comprising a cover configured to cover an opening in the cable raceway in a location where the cable guide is not located.

19. A method for directing a cable through an exit in a cable raceway, comprising the steps of:
providing a cable raceway;
providing a cable guide, the cable guide including:
  (i) a cylindrical base portion having a base radius sized to prevent breakage of a cable running over the cylindrical base portion;
  (ii) two cylindrical arms extending from the cylindrical base portion in a direction approximately perpendicular to a direction of travel of the cable raceway, the two cylindrical arms having an arm radius sized to prevent breakage of the cable running around the two cylindrical arms, the two cylindrical arms located on opposing ends of the cylindrical base portion;
  (iii) two cylindrical legs extending from the cylindrical base portion in a direction approximately opposite of the two cylindrical arms, the two cylindrical legs having a leg radius sized to prevent breakage of the cable running around the two cylindrical legs, the two cylindrical legs located on opposing ends of the cylindrical base portion; and
  (iv) a slot extending through the cylindrical base portion and extending through the two cylindrical legs;
positioning the slot over and around a side of the cable raceway such that the side enters into the slot, thereby securing the cylindrical base portion to the side of the cable raceway;
running a cable along the cable raceway and through the two cylindrical arms of the cable guide to exit the cable raceway.

20. The method of claim 19, wherein the cable guide includes a first half member and a second half member, the first and second half members mirror images of one another, and the first and second half members configured to be mounted together to form the cylindrical base portion, the two cylindrical arms and the two cylindrical legs.

21. A cable guide comprising:
a cylindrical base portion configured to attach to a cable raceway, the cylindrical base portion having a base radius sized to prevent breakage of a cable running over the cylindrical base portion;
two cylindrical arms extending from the cylindrical base portion in a direction approximately perpendicular to a direction of travel of the cable raceway, the two cylindrical arms having an arm radius sized to prevent breakage of the cable running around the two cylindrical arms, the two cylindrical arms located on opposing ends of the cylindrical base portion;
two cylindrical legs extending from the cylindrical base portion in a direction approximately opposite of the two cylindrical arms, the two cylindrical legs located on opposing ends of the cylindrical base portion;

a slot extending through the cylindrical base portion and extending through the two cylindrical legs, the slot configured to fit over and around a first side of the cable raceway such that the first side enters into the slot to secure the cylindrical base portion to the first side of the cable raceway;

an adapter;

an arm slit in each of the two cylindrical arms configured to attach to the adapter; and a channel raceway fitting attached to the adapter;

wherein the two cylindrical arms each extend a first distance from the base portion, and the two cylindrical legs each extend a second distance from the base portion, the first distance equal to the second distance; and wherein the base portion has a first circumference, the two cylindrical arms each have a second circumference and the two cylindrical legs each have a third circumference, the first, second and third circumferences equal to one another.

* * * * *